United States Patent [19]
Schneider

[11] Patent Number: 5,184,292
[45] Date of Patent: Feb. 2, 1993

[54] CLOSED-LOOP CONTROL METHOD AND APPARATUS

[75] Inventor: Frank Schneider, Garching, Fed. Rep. of Germany

[73] Assignee: Max-Planck-Gesellschaft zur Foerderung der Wissenschaften e.V., Fed. Rep. of Germany

[21] Appl. No.: 583,516

[22] Filed: Sep. 17, 1990

[30] Foreign Application Priority Data

Sep. 18, 1989 [DE] Fed. Rep. of Germany ....... 3931133

[51] Int. Cl.$^5$ .............................................. G05B 11/42
[52] U.S. Cl. .................................... 364/162; 364/153; 364/155
[58] Field of Search ............... 364/162, 163, 152, 153, 364/154, 155, 166

[56] References Cited

U.S. PATENT DOCUMENTS

| | | | |
|---|---|---|---|
| 4,250,543 | 2/1981 | Smith et al. | 364/162 |
| 4,872,104 | 10/1989 | Holsinger | 364/166 |

FOREIGN PATENT DOCUMENTS

| | | |
|---|---|---|
| 3118259C | 12/1982 | Fed. Rep. of Germany . |
| 3716539A | 1/1988 | Fed. Rep. of Germany . |
| 3719581 | 12/1988 | Fed. Rep. of Germany . |
| 3743892C | 12/1988 | Fed. Rep. of Germany . |
| 1176832 | 1/1970 | United Kingdom . |
| 211636 | 9/1983 | United Kingdom . |

OTHER PUBLICATIONS

IEEE Pub. No. 81CH1715-2 NPS, "Plasma Control Techniques of the ASDEX-Feedback System" by F. Schneider, Oct. 26–29, 1981.
Siemens Zeitschrift 51 (1977) Heft 5, pp. 394–398; Von Siegfried Meyer, et al.: Adaptiver Abtast-Regler fur das Längs-, Setten- und Schnittregister Von Tiefdruck--Rotations- Maschinen.
Regelungstechnische Praxis 25, Jahrgang 1983 Heft 10, pp. 423–426, W. Eckelman, et al.: Vergleich Von Regelalgorithmen In Automatisierungssystemen.
German Technical Magazine "Regelungstechnik und Proze-Datenverarbeitung" No. 4, (1971), pp. 155 to 162 (von D. Schröder).
Publication CERN-ISR-OP/74-9 "Stepping Motor Driver with Interpolated Steps" By F. W. Schneider, Geneva, Feb. 1974.

Primary Examiner—Jerry Smith
Assistant Examiner—Paul Gordon
Attorney, Agent, or Firm—Nields & Lemack

[57] ABSTRACT

Method and apparatus for closed-loop control of a variable in which an analog manipulated signal is produced for discrete time intervals in response to an error signal. The effect of the manipulated signal is confined to a predetermined manipulating range. The response to the error signal is distributed among a plurality of subsequent discrete time intervals when it tends to exceed the manipulating range of the control, so that the entire rate action becomes effective. The control according to the invention allows to deal with delays up to the third order with high accuracy and extraordinary speed. Special correcting means allow to apply this type of control also to line-commutated converters and choppers.

29 Claims, 8 Drawing Sheets

CLOSED-LOOP CONTROL METHOD AND APPARATUS

FIELD OF THE INVENTION

The invention relates to control methods and apparatus, more specifically to methods and apparatus for generating a manipulating or actuation signal in response to a deviation or error signal in a control system. The described controllers are useful both in open-loop and closed-loop control systems. A preferred application is the control of thyristor converters.

DESCRIPTION OF THE RELATED ART

In a closed-loop control system the value of some output quantity of the system is continuously or periodically measured and used to manipulate another quantity, an input to the system, in such a way as to make the first quantity or some other dependent outputs approach a desired value or to follow a desired pattern of values. Closed-loop control systems are also termed feed-back systems.

A closed-loop or feedback control system generally comprises a controlled system (which is also termed "plant") and measuring means and controlling means. The measuring means determines the value of the quantity to be controlled and compares it with a desired value of said quantity. The controlling means accepts this information, usually at a low power level, and provides an output, the manipulated variable, at a power level required to control the plant. Thus the manipulated variable is an input to the plant modulated in such a manner as to force the controlled quantity to approach the desired value or to follow the desired pattern of values.

Various ways are known in the art of closed-loop control systems, to generate the manipulated signal in response to the deviation or "error" between the actual value of the quantity to be controlled, and its desired value, e.g. proportional to the error. (P-type control), depending on the rate of change or derivative of the error (D-type control) and depending on the integral of the error (I-type of control). These types of controlling action can be combined.

The known controlling apparatus are usually implemented with linear circuits, so that only controllers with a single D-action can be realized, e.g. PD or PID action. Only plants with second order or quadratic delays can be controlled with optimum speed by such controllers which is often not sufficient for more sophisticated control tasks.

Other methods and apparatus use discrete digital feedback control algorithms which are able, at least for small signals, to compensate also higher order delays; however, they are not satisfactory for high-speed controlling because of speed and synchronization problems.

A further drawback of digital, discrete control means is that they cannot be used for periodically operating systems, the period of which is continuously varied by the control, as line-commutated converters and pulse-width modulated choppers with continuously varying firing intervals because the known discrete closed-loop control algorithms require a constant clock period which results in unacceptable beat and aliasing effects.

The control of periodically operating systems as the mentioned line commutated converters, inverters and pulse-width modulated choppers is commonly effected by using a periodic signal exhibiting a positive going signal transition and a negative going signal transition in each of its cycles, and varying the time of occurence of one of said transitions. A drawback of this type of control is that when the positive going signal transition is advanced in time, the center of the controlled signal is advanced in time relative to the basic signal while when the positive going transition of the controlled signal is delayed, the center of the controlled signal is delayed relative to the basic signal. This effect prevented up to now a time-optimized discrete control in which at the beginning of a control cycle manipulated signals are produced which correspond to a rate of change of the error which is greater than the actual rate of change of the error, and towards the end of the control cycle manipulated signals are produced which correspond to a rate of change of the error which is smaller than the actual rate of change, because positive signal transitions are overemphasized in respect to negative signal transitions in such a type of control.

SUMMARY OF THE INVENTION

It is an object of the invention to provide a method and an apparatus for closed-loop control of a magnitude or variable which allow a discrete closed-loop control with high speed and accuracy.

In a closed-loop control or regulating method according to a first aspect of the invention, a manipulated or control signal is produced in response to a deviation or error $X_d$ of an actual value from a desired value. The manipulated signal is effective in a predetermined manipulating range and depends at least on a derivative signal which a function of the rate of change of the error $X_d$, and a proportional signal which depends on the magnitude of the error $X_d$.

According to the invention, said method further comprises a) defining successive time intervals i with a clock rate $t_i$ by a clock signal;

b) when said manipulated signal exceeds said manipulating range in a given time interval i , limiting said manipulating signal in this time interval to said manipulating range;

c) in the time interval which follows that given time interval, adding the exceeding portion of said manipulated signal of said given time interval to the manipulated signal $U_{i+1}$ generated during the following time interval i+1, and d) repeating steps b) and c) if the resulting manipulated signal exceeds the manipulating range.

The principle of the control method according to the first aspect of the invention is that for producing a manipulated signal in response to an error, the manipulated signal including a derivative component (depending on the rate of change of the error), and a component proportional to said error, the values of said components are established discretely, while the signal processing is effected in an analog fashion, resulting first in an optimum control of plants with delays up to the third order which previously was possible only by completely discretely operating control algorithms with a constant frequency clock, and secondly a very high resolution and a very high speed is obtained, e.g. responses within e. g. 20 microseconds which previously was possible only with completely analog signal processing.

For implementing this method, successive time intervals with a clock rate are defined by a clock, said clock rate being variable to match the time intervals to the momentary period of the controlled variable. In each time interval a derivative signal depending on the rate of change of the error, and a proportional signal depending on the magnitude of the error, are produced and used, if appropriate together with further regulating signals, to form said manipulated signal. When the manipulated signal tends to exceed the manipulating range, it is limited so that it is kept within the manipulating range. The portion of the manipulating signal which exceeds the manipulating range in a given time interval is added to the manipulated signal of the subsequent time interval; thus, even in case of fast and large errors, nothing of the manipulated signal of any time interval is lost. This is in contrast to the known analog control systems; furthermore, each control process is effected completely and within the least possible time for the available manipulating range.

It is preferred to limit the proportional signal so that it corresponds to such a (fictitious) error which would result in the derivative signal produced up to the respective time.

It is further preferred to derive the derivative signal from the mean value of the error in each time interval by comparing the mean value of each time interval with the mean value of at least one preceding time interval. The resulting error is weighted with a factor which depends on the ratio of a derivative action time constant and the clock period.

The derivative action time constant is related to the time difference between two controls or in other words the time, which the manipulating means or actuator of a PD controller needs from the beginning of the occurence of an error which changes with a constant rate, to effect, on the basis of the proportional action, the same effect as it had provided immediately by its derivative action.

According to a further preferred feature of the present invention, a signal for optimizing the speed of the control is derived from the derivative signal. The optimizing signal corresponding in a first, accelerating phase to a rate of change of the error which is larger than the actual rate of change of the error, and in a subsequent retarding phase to a rate of change of the error which is smaller than the actual rate of change of the error. This results in a further acceleration of the control action. The speed optimizing signal mentioned above is preferably generated in such a manner that the time integral of the effect of the signal remains constant so that the control action is performed in the least possible time and in spite thereof without overshooting.

An important advantage of the control methods according to the invention is that by deriving the derivative signal from the mean value of the error in each time interval, the error signal is estimated with the correct magnitude in the least possible time while with the prior art discrete control algorithms performed by digital control means, the input signal must be smoothed over several samples to comply with the Nyquist-Shannon theorem.

According to a further aspect of the invention, a closed-loop control method is provided in which a manipulated signal which is represented by a discrete pulse having predetermined length and height, is divided into first and second partial signals, the second partial signal is delayed by at least one clock period and then combined with a first partial signal of a corresponding subsequent time interval, so that a manipulated signal pulse is formed the position in time of which being corrected in respect to the original manipulated signal pulse. It can be achieved by this means that the pulses, independently of their width and /or height, are always centered in time on the same predetermined point of each period of the basic signal. Thus, positive and negative signal transitions are weighted equally.

When the control is effected by variation of a repetitive basic signal, the periods of which each comprise, a positive going and a negative going signal transition, the second partial signal is delayed by one or plurality of periods when the transition of the control signal is advanced in time by the manipulated signal, while when the manipulated signal delays the transition of the controlled signal, the second partial signal is delayed and in addition inverted.

A controlling apparatus for a closed-loop regulating system in which a derivative signal responsive to the rate of change of an error and a proportional signa which is proportional to the magnitude of the error are produced, comprises according to the invention clock means which produces clock pulses which define successive time intervals and are synchronized with manipulating or actuator means. Differentiating or derivative means produce in each time interval a derivative signal which is a function of the rate of change of an error, and a proportional signal. Limiter means limit said signals, so that a resulting manipulated signal does not exceed its manipulating range. Means are provided in which those portions of said signals which would result in exceeding said manipulating range are added to the corresponding signal of a subsequent time interval.

Preferably means is provided or the differentiating means, the limiting means and the adding means are constructed so that the proportional signal of each time interval corresponds to an error which would produce the derivative signal generated up to this point of time.

According to further aspect of the invention, an apparatus which produces a manipulated signal in form of discrete pulses in response to an error, comprises correcting means which receives the error-responsive manipulated signal and includes delay means by which a portion of the received signal is delayed and combined with a undelayed portion of the signal of a following time interval.

A closed-loop regulating system according to a preferred embodiment of the invention comprises first controlling means which processes only such a portion of an error that a resulting manipulated signal is confined to its manipulating range within each time interval. The portion of the manipulated signal which exceeds the manipulating range is added to the manipulating signal of a subsequent time interval.

BRIEF DESCRIPTION OF THE DRAWINGS

FIGS. 4a) to 4e)show waveforms useful for explaining the operation of the control means according to the invention;

FIGS. 5a)-5d), 6a), 6b), 7a), 7b), and 8 show waveforms useful for understanding the correcting circuitry of the present control system.

DESCRIPTION OF THE PREFERRED EMBODIMENTS

Figure 1:
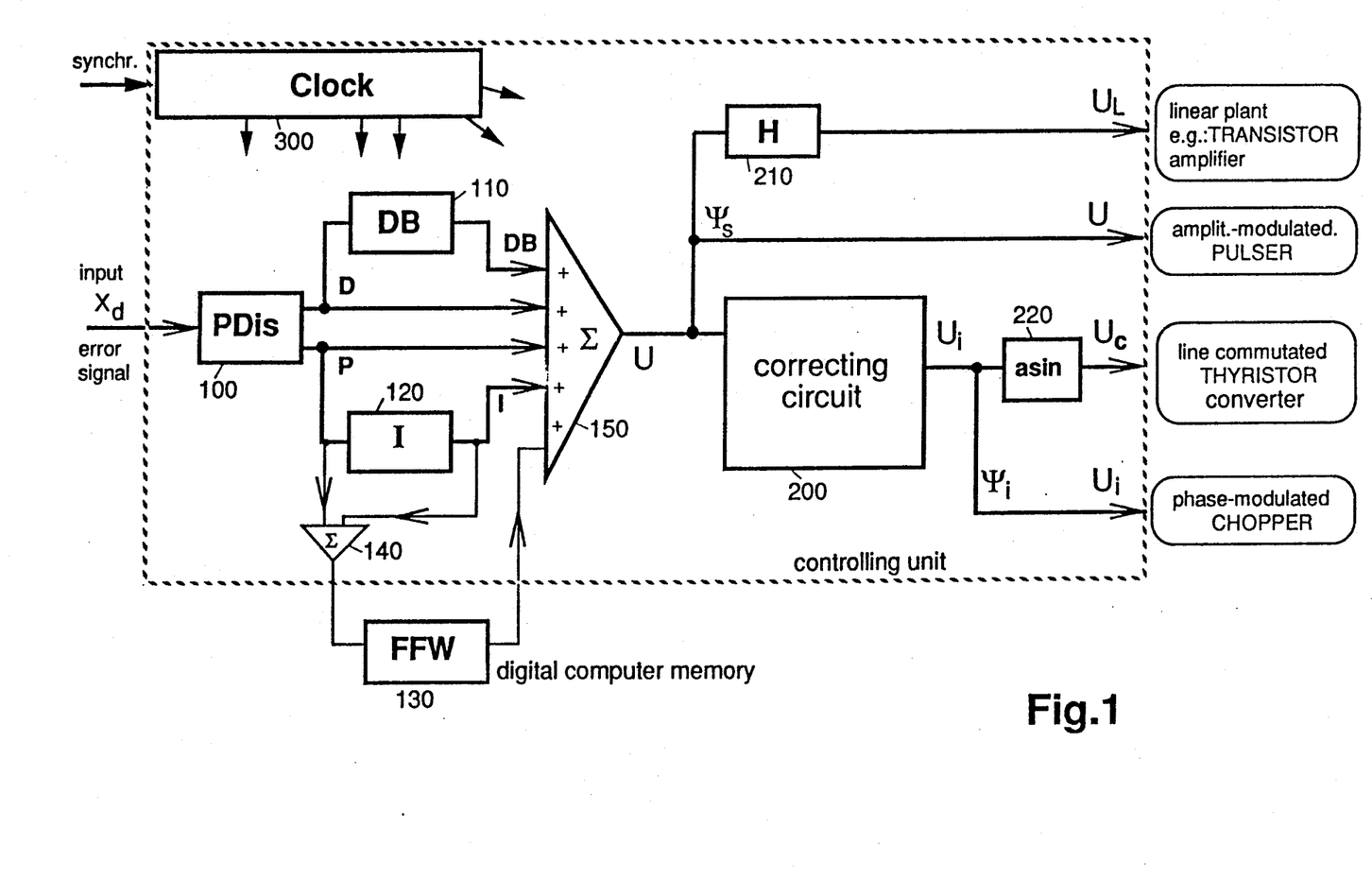
FIG. 1 is a block diagram of a first embodiment of a closed-loop control system according to the invention which comprises a PDis type controller, a DB type controller, an I type controller and a correcting circuit for implementing a closed-loop control method according to the invention.

A preferred embodiment of a controlling unit is shown in FIG. 1 within the rectangular broken line. The controlling unit receives a synchronizing signal and an error signal $X_d$. The error signal is a function of the difference between an actual value of a controlled variable and a desired value of this variable. The error signal $X_d$ is applied to the input of a first controller 100. The controller 100 has a first output D which provides a derivative signal which is a function of the rate of change of the error $X_d$, and a second output P which provides a proportional signal which is a function of the magnitude of the error $X_d$. A second controller 120 has an input coupled to the second output P of the first controller 100. The second controller 120 comprises integrating means and provides at its output I a signal which is a function of the time integral of the proportional input signal. A third controller 100 has an input coupled to the first output D of the first controller 100 and, thus receives said derivative signal. The third controller 110 comprises means responding to said derivative signal and providing an accelerating, signal during a first phase and a retarding signal during a subsequent phase of operation, which signals are available at an output DI: of the third controller 110.

A summing circuit 150 has a plurality of inputs which receive the signals from the first and second outputs of the first controller 100 and from the outputs of the second and third controllers 120, 110 to form a combined manipulated signal which is available at an output U of said summing circuit 150. Said first, second and third controllers and of said summing circuit 150 are controlled by a clock 300 which may receive the synchronizing signal and produces clock signals each defining an interval of time; the signals in each of said first, second and third controllers being processed as discrete values within each interval.

The manipulated signal from the output U of the summing circuit 100 is directly applied to a first output U of the controlling unit. The signal from the output U is useful for controlling manipulating and actuator means which generate amplitude-modulated pulses. The output U of the summing circuit is further coupled to the input of a holding circuit 210 which converts the individual amplitude-modulated pulses to a continuous step function which also may be regarded as an amplitude-modulated pulse train consisting of pulses having a duration or width equal to the duration of the time intervals. The step signal produced at an output of the circuit 210 is applied to a second output $u_L$ of the controlling unit which is useful for controlling a linear manipulating or actuator means, e. g. a transistor amplifier.

A correcting circuit 200 has an input coupled to the output U of the summing circuit 150 and, thus receives the unmodified manipulated signal to provide a modified manipulated signal at an output $U_i$. In short the modification of the signal from the output U of the summing circuit 150 consists in dividing the discrete pulse forming the manipulated signal U during each time interval first into at least first and second portions. A first portion of each pulse is then delayed by at least one time interval and modified in accordance with a predetermined function, and then combined with at least one undelayed pulse portion to provide modified pulses the position in time of which being modified or corrected with reference to the time intervals. The modified pulses which appear at an output $I_i$ of the correcting circuit 200 are applied to a third output of the controlling unit, at which they are available for controlling a puls-width or phase modulated manipulating or actuator means as a chopper. The modified pulses from the output $U_i$ of the correcting circuit 200 are further applied to linearizing means 220, the output of which being coupled to a fourth output $U_c$ of the controlling unit which is useful for controlling e.g. a line-synchronized converter, the sine-wave dependency of which being compensated by said linearizing means 220.

The construction and function of the described components of the controlling unit will now be explained.

Figure 2:
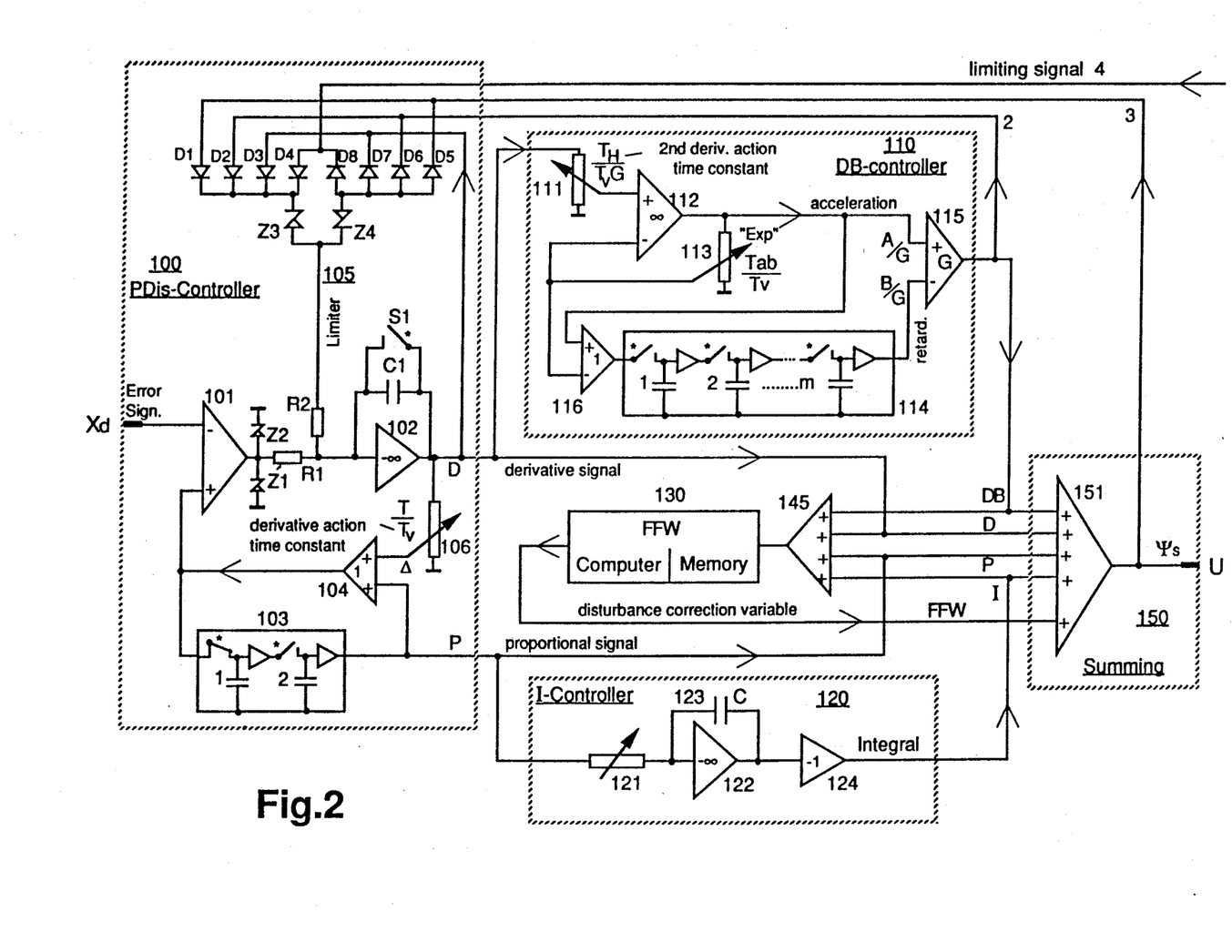
FIG. 2 is a circuit diagram of a portion of the controlling means of FIG. 1 showing more details of the PDis type controller, the DB type controller and the I type controller.

FIG. 2 is a more detailed circuit diagram of embodiments of the first controller 100, the second controller 120 and the third controller 110, the output signals of which being combined in the summing circuit 150. The first controller 100 which may be termed PDis type controller (Proportional-Derivative-discrete) controller, includes a differential amplifier 110 having an inverting input (−) for receiving the error signal $X_d$ and a non-inverting input (+) and an output. An operational amplifier 102 the input and output of which are coupled by a capacitor Cl to form an integrator, has its input coupled to the output of said differential amplifier 101 via a resistor R1 The integrator serves to smooth or low-pass filter the output pulse of the differential amplifier 110. A switch S1 is connected across the capacitor Cl and is controlledly the clock 300 (FIG. 1) to close at the beginning of each cycle of the clock signal $T_i$ to reset the integrator. The junction between the output of the differential amplifier 110 and the resistor R1 is coupled via first and second oppositely poled zener diodes Z1, Z2 to ground. The output of the integrating operational amplifier 102 is coupled to a first fixed terminal of a potentiometer 106, the second fixed terminal of which being coupled to ground. A summing circuit 104 has its first input (+) coupled to a slider of the potentiometer 106 and its output coupled to the non-inverting input (+) of the differential amplifier 104. A one-stage shaft register 103 has its input coupled to the output of the summing circuit 104 and its output coupled to a second input (+) of said summing circuit 104. The shift register 103 has input circuit 1 and an output circuit 2 which are clocked by alternatingly actuated switches which in turn are controlled by the clock signal. The junction between the output of the shift register 103 and the second input of the summing circuit 104 constitutes the second output P of the controller 100 which provides the proportional signal, while the first output D which provides the derivative signal is constituted by the junction between the output of the operational amplifier 102 and the first fixed-terminal of the potentiometer 106. A first terminal of a resistor R2 is coupled to the junction between the resistor R1 and the input of the amplifier 102, the second terminal of resistor R2 being coupled to a limiter 105. The limiter 105 includes a zener diode Z3, the anode of which being connected to resistor R2, and a zener diode Z4, the cathode of which being coupled to the resistor R2. The cathodes of four diodes D1 to D4 are coupled to the cathode of zener diode Z3 and the anodes of four diodes D5 to D8 are coupled to the anode of the zener diode Z4. The remaining terminals of each of the pairs of diodes D1, D5; D2, D6; D3, D7; and D4, D8 are coupled together to form four input terminals of the limiter circuit 105.

In operation, the switch S1 of the integrating operational amplifier, and the switches of the shift register 103 are actuated by the clock 300 (FIG. 1) to define the time intervals and sample the signals. If we assume that the input error signal $X_d$ at the inverting input (−) of the differential amplifier increases from zero during the first time interval, the error signal will be integrated by the integrator 102 during the first time interval and fed back via the potentiometer 106 and the summing circuit 104 to the non-inverting input (+) of the differential amplifier 101. The resistance ratio of the potentiometer 106 corresponds to the ratio $T/T_V$ of the clock period to the derivative action time constant (defined above). Since the input signal $X_d$ was zero before the considered clock period, the output signal of the shift register 103 is zero during the first time interval, thus, the input signal at the non-inverting input of the differential amplifier 101 is $$\Delta = D^* T/T_V. \tag{1}$$

wherein $D^*$ is the amplitude of the signal at the output D. The signal value $D^*$ is entered into the shift register 103 during the first time interval and appears as proportional signal at the output P in the second time interval. The proportional signal obtained in the first time interval is also added to the value $D^*$ of the second time interval in the summing circuit 104 and again applied to the non-inverting input of the differential amplifier 101, thus, a comparison of the error $X_d$ with that sum is effected.

When the error $X_d$ does not change and the manipulating range is not exceeded by the first pulse of the derivative signal, then $\Delta = X_d$ and also $P = X_d$. However, when $X_d \cdot T_V/T$ exceeds the manipulating range, which is defined by the zener diodes Z1, Z2 and the limiter 105, a remainder $X_d - \Delta$ remains at the input differential amplifier 101 after the first step or time interval and this remainder produces a new pulse at the output D in the second time interval. By this means, the value of P is increased by $\Delta$ during the following intervals until the value $X_d$ is fully dealt with.

The cooperation of the limiter 105 and the summing circuit 104 secures that the signals at the outputs D and P are constrained to the manipulating range and that the portion of the signals which exceeds the manipulating range is not lost but used in the following time interval(s). In other words, only such a portion of the input signal $X_d$ appears at the proportional output P as can be differentiated within the manipulating range and is applied to the output D. Thus, the full lead or rate action of each step change of the input signals codes into bearing and not only the portion which falls into the manipulating range as with the prior art controllers.

Figure 4:
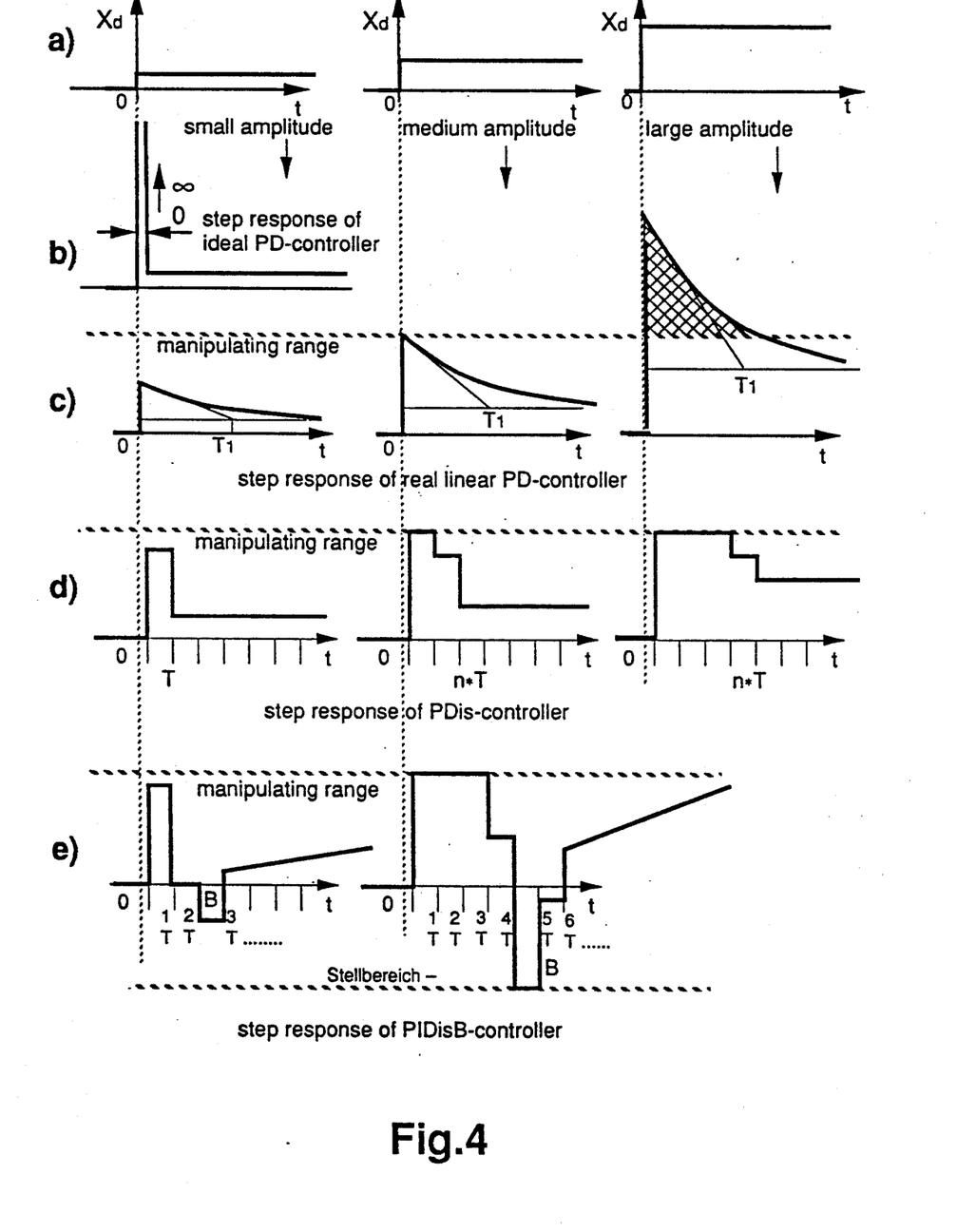

The situation will now be explained in more detailed with reference to FIGS. 4a to FIG. 4d. FIG. 4a shows three versions of a deviation or error signal $X_d$ which each exhibit a step-type change e.g. at time t=0. FIG. 4b shows the step function response of an ideal PD-type controller for the error signal step of small amplitude, this response includes a step of infinite height at T=0, thereafter the output of the controller attains a value which is equal or proportional to the error $X_d$. For error signal steps of larger amplitudes as shown in the second and third diagrams of FIG. 4a, the response differs only in the amplitude of the constant signal portion after t=0.

It goes without saying that no actual manipulating means can follow such an infinitely large and correspondingly infinitely narrow pulse as it would be produced by an ideal PD-type controller in response to a step change of the error signal. For this reason, a time constant T1 is incorporated in real systems by which the step response of the controller is smoothed, so that step responses as shown in FIG. 4c result in response to error signal steps of first, small, second medium and third, large amplitudes, respectively, shown in FIG. 4a.

It is assumed that the small and medium amplitudes of the step change of the error $X_d$ will not cause the step response of the real (linear) PD type controller to exceed the manipulating range so that the entire rate action will become effective. However, the large, third amplitude of the error $X_d$ shown at the right side of FIG. 4a, would cause the step response of the controller to exceed the manipulating range (shown by a broken line in FIG. 4c) so that the exceeding, cross-hatched portion of the step response shown on the right side of FIG. 4c would be lost. Thus, the full rate action of the step will not become effective and the control action would be less than desired.

The step response of the PDis-type controller according to the invention is shown in FIG. 4d. When the error $X_d$ is small, (FIG. 4a, left diagram), the derivative pulse D of the controller remains within the manipulating range so that the entire rate action becomes effective within the clock period T of the first time interval. The error $X_d$ of medium and large amplitude (middle and right diagram of FIG. 4a) would result in a derivative or rate pulse which when to be dealt with completely within the first time interval, would exceed the manipulating range to a more or less extent. The PDis-type controller according to the invention prevents the loss of the portion of the response which exceeds the manipulating range by distributing or transferring the exceeding portion of the step response to the following time interval(s) until the entire step response and, thus, the entire rate action, has been dealt with, as shown for errors of medium and large amplitudes in the middle and right diagram, respectively, of FIG. 4d. Thus, each control process is carried out in the shortest time which is possible with the available manipulating range and, thus an optimum manipulated speed results.

The second, I-type controller 120 shown in FIG. 2 comprises an integrator which includes an operational amplifier 122 and a capacitor 123 connected in parallel. The input of the controller 120 is coupled to the proportional output P of the first controller 100 via an adjustable resistor 121. The output signal of the integrator 122, 123 is applied to an inverter 124, the output of which provides the output signal of second controller 120. In spite of the fact the I-type controller operates purely linearly, an essential advantage is achieved by the combination of the I-type controller and the PDis-type controller 100 according to the invention over prior art PID-type controllers: In case of overdriving the controller, the integrator 122', 123 will integrate up only so far as suitable for the available manipulating range rather than integrate up uncontrolled, because the integration is performed on the basis of the proportional signal P, the amplitude of which had already been limited, rather than on the basis of the overdriving error input signal $X_d$.

FIG. 2 shows also a first embodiment of the DB-type third controller 110. The controller 110 includes a differential amplifier 115 which has a predetermined gain, and an output which produces the output signal of the DB controller. The derivative signal from the derivative output D of the first controller is applied to a first fixed terminal of a potentiometer 111, the other fixed terminal being connected to ground. A second differential amplifier 112 has a non-inverting input (+) coupled to a slider of the potentiometer 111, and an output coupled to the non-inverting input (+) of the differential amplifier 115, so that the latter receives the derivative signal after modification by the potentiometer 111 and the differential amplifier 112. The resistance ratio of the potentiometer 111 is set to correspond to the ratio of a second derivative action time constant $T_H$ to the first derivative action time constant $T_V$ multiplied by the gain G of the differential amplifier 115, i.e. $T_H/T_V G$. A portion of the signal from the output of the differential amplifier 112 is coupled to the inverting input of the differential amplifier 112 via a potentiometer 113. The output signal of the differential amplifier 112 is further coupled to the non-inverting input of the differential amplifier 115. The signal at the junction between the slider of the potentiometer 113 and the inverting input of the differential amplifier 112 is applied to the inverting input of a differential amplifier 116 operating as subtracter. The output of the subtracter 116 is coupled to the input of a m stage shift register 114. The output of the shift register 114 is coupled to the inverting input (−) of the differential amplifier 115.

Figure 3A:
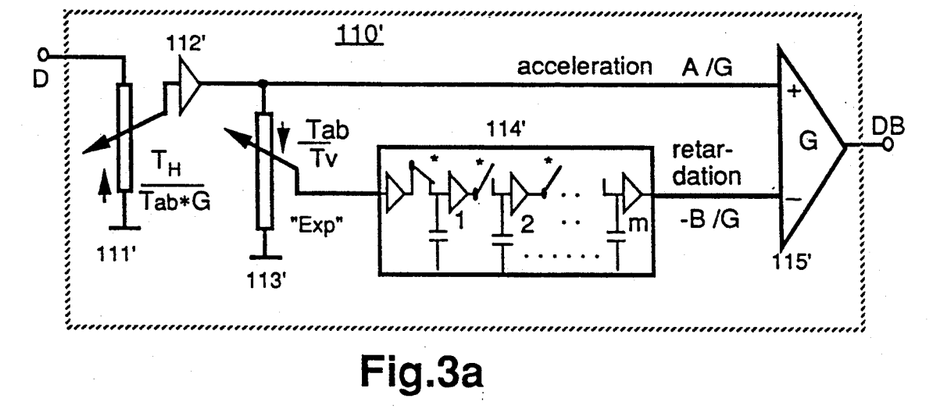
FIG. 3a is a circuit diagram of a modified embodiment of the DB type controller.

The DB-type controller 110 processes the pulse type derivative signal $D_i$ of each time interval (i) to produce pulses which in an accelerating phase represent a larger rate of change of the error $X_d$ than the pulse-type derivative signal $D_i$ and in a retarding phase (in time interval i+m) subsequent to the accelerating phase pulses having a somewhat smaller amplitude and opposite polarity. This is achieved by applying the derivative signal pulses $D_i$ first via the potentiometer 111 and the differential amplifier 112 as accelerating amplitude signal A to the non-inverting input of the differential amplifier 115 which provides an output signal, the amplitude of which depends on the setting of the potentiometer 111 and the gain G of the amplifier 115. Secondly, the derivative signal pulses $D_i$ are coupled from the output of the differential amplifier 112 directly to the non-inverting input of the subtracter 116 and via the potentiometer 113 to the inverting inputs of the differential amplifier 112 and the subtracter 116. The pulses appearing at the output of the subtracter 116 are delayed by m clock periods by the shift register 115 and the output signal of the shift register 114 is applied as retarding or delay amplitude signal B to the inverting input of the differential amplifier 115, the non-inverting input of which receiving directly the accelerating input signal A derived from the output of the differential amplifier 112. The ratio of the retarding amplitude B to the accelerating amplitude A $$B/A = -e^{-T_{ab}/T_V} \approx -\left(1 - \frac{T_{ab}}{T_V}\right) \quad (2)$$

is set as value $T_{ab}/T_V \approx$ "Exp" by the potentiometer 111. The combination of the differential amplifier 112, the potentiometer 113 and the subtracter 116 has the effect that the following relationship holds through for the amplitudes of the signals of the DB-type controller:

$$(A+B) = P_i T_H/T_i = D_i T_H/T_V \quad (3)$$

wherein $P_i$ is the amplitude of the proportional signal step, $D_i$ is the amplitude of the derivative pulse, $T_i$ the clock period, $T_H$ is the second derivative action time constant and $T_V$ the first derivative time constant of the the controller. The conditions for B/A and A+B can also be implemented by a second embodiment shown in FIG. 3a.

The DB type controller 110' shown in FIG. 3a comprises a differential amplifier 115' having a gain factor G and an output which provides an output signal DB of the controller. An output of a m stage shift register 114' is coupled to the inverting input of the differential amplifier 115'. The embodiment of FIG. 3a differs from the embodiment of FIG. 2 in that the input terminal of the shift register 114' is directly connected to the slider of a potentiometer 113', which has a first fixed terminal coupled to a line connecting the non-inverting input (+) of the differential amplifier 115 to the output of an operational amplifier 112'. The other fixed terminal of the potentiometer 113 is connected to ground. The amplitude of the input pulses of the controller 110' which are derived as in FIG. 2, is adjusted by a potentiometer 111', the resistance ratio of which corresponding to the ratio between the second derivative action time constant $T_H$ and the product of the gain G of the differential amplifier 115' and the delay time $T_{ab}$ between the accelerated and the retarded pulses. The slider of the potentiometer 11' is coupled to the input terminal of the operational amplifier 112'. An advantage of the embodiment of the DB type controller shown in FIG. 3a is that it is simpler in construction and overdrive-insensitive.

The output signals D and P from the output terminal of the first controller 100 (PDis-type controller), the output signal I from the output terminal of the second controller 120 (I-type controller) and the output pulses $DB_i$ from the output terminal of the third controller 110 (DB-type controller) are coupled to respective input terminals of a summing circuit 151 to provide a combined output signal which is the manipulating signal U responsive to the error $X_d$.

Referring again to FIG. 2, the control unit shown further comprises a summing circuit 150 which also receives the output signals of the first, second and third controllers and forms from these signals a combined signal which is stored in memory and computing means 130 for calculating, in the case of reproducible processes, a control function for controlling subsequent control processes. The function is provided with a factor K $$K = 1 + 1/G_L \quad (4)$$

wherein $G_L$ is the loop gain of the entire control unit. The time function calculated in this manner is advanced by a period of time $T_O$ which is equal to the time which the control unit of the controlled system or plant needs for processing.

$$F^*(t) = F(t + T_O). \tag{5}$$

By this means, reproducible processes can be controlled in an optimum manner because the control unit needs only to compensate for random disturbances or errors, as explained in the publication by F. Schneider, "Plasma Control Techniques of the ASDEX Feedback System", 9th Symposium on Engineering Problems of Fusion Research, Chicago, 26th to 29th October, 1981. The memory and computing means 130 provides a feed-forward signal corresponding to the above function and applies it to a further input of the summing circuit 151, which thus serves for superimposing disturbance variables.

The effect of the DB-type controller 110 will be explained with reference to FIG. 4e which shows the time dependency of the final manipulating signal U for an error $X_d$ of small and medium amplitudes. When the error $X_d$ is relatively small (FIG. 4e, left diagram) first an accelerating pulse is produced in the first time interval from t=0 to t=1T. If m=2 has been chosen as in this example, the manipulated signal U of the second time interval from t=1T to t=2T has the value zero or P, if the P component is also considered. In the third time interval from t=2T to t=3T, the retarding or delay action of the DB-typer controller becomes effective, thus a negative pulse is generated in spite of the fact that the error $X_d$ still has a constant positive value. Thereafter, the manipulated signal has a value which results from superposition of the integral signal I and the proportional signal P, thus the manipulated signal rises linearly. Errors $X_d$ with larger amplitudes produce a response pattern as shown in the right diagram of FIG. 4e. This pattern is basically similar to the left diagram of FIG. 4e with the exception that by the action of the PDis-type controller, a plurality of time intervals are needed for dealing with the step response as explained with reference to the middle and the right diagram of FIG. 4d, and the negative delaying pulse appears only thereafter: this pulse is also distributed to a plurality of time intervals if it exceeds the manipulating range.

Figure 3B:
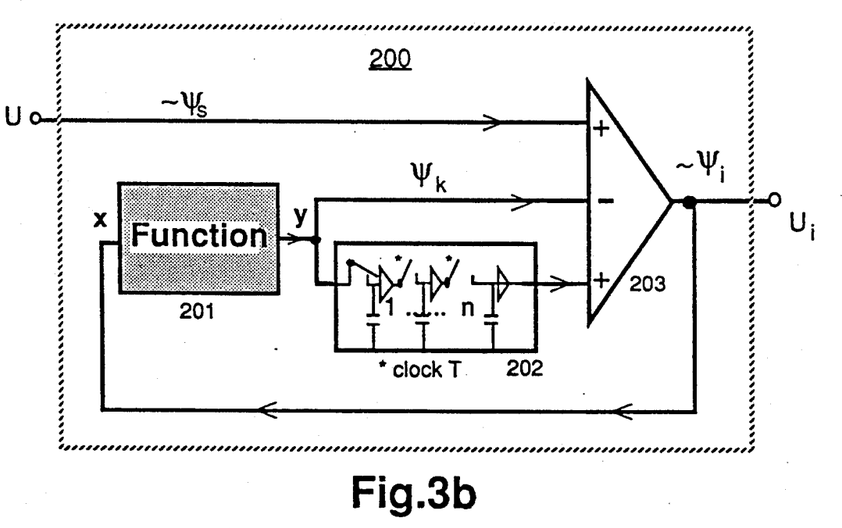
FIG. 3b is a circuit diagram of an embodiment of the correcting circuit of the regulating means according to the invention.
Figure 5:
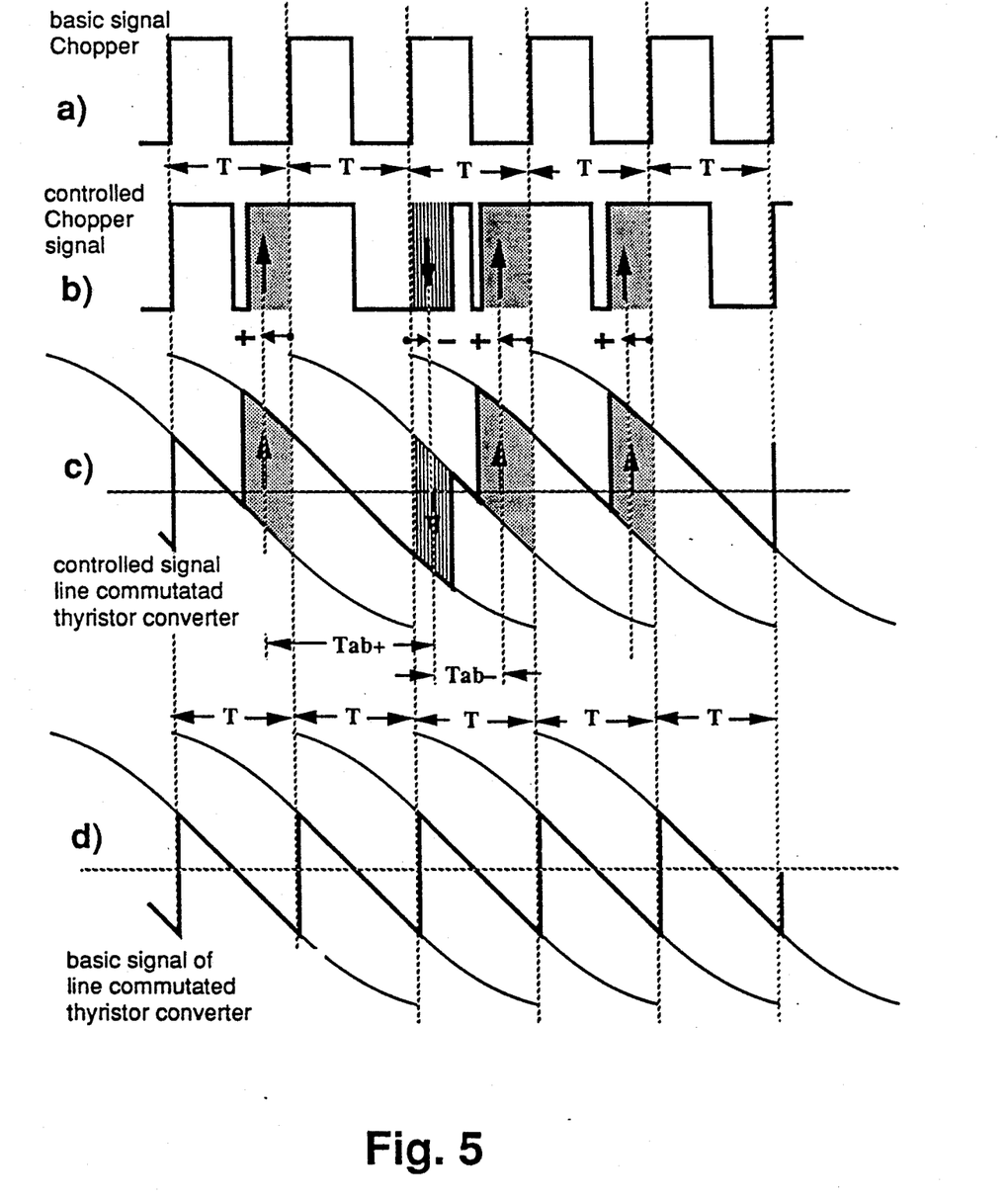
Figure 6:
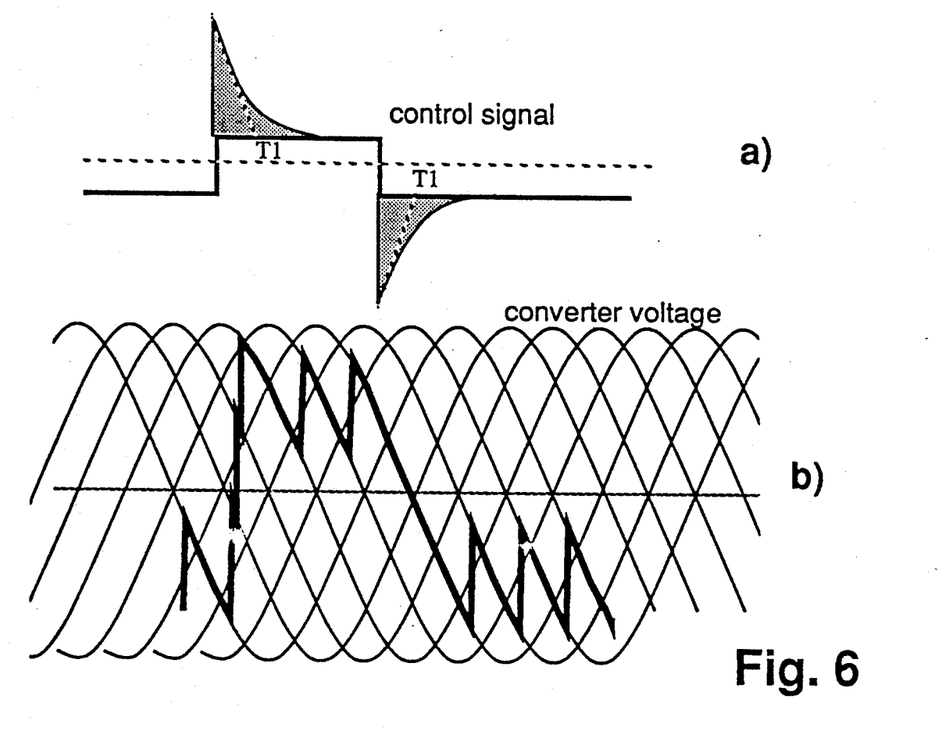

FIG. 3b is a circuit diagram, partly in block form, of a preferred embodiment of the correcting circuit 200 which compensates polarity-dependent time-shifts of signals in pulse-width modulated systems such as choppars and phase-controlled (line-synchronized) converters. The problem inherent in such systems will be explained with reference to FIGS. 5 and 6. As shown in FIG. 5a, a pulse-width modulated chopper provides an uniform periodic basic output signal when operating in its unregulated basic mode. The basic signal has a period D and each cycle comprises a positive going signal transition which occurs in the waveform shown in FIG. 5a at the beginning of each cycle and a negative going signal transition occurring in the middle between the positive going transitions of two subsequent cycles. The system is regulated by varying the duty cycle of the rectangular waveform or pulse train as e.g. shown in FIG. 5b. In the example chosen the position of the negative signal transition is maintained while the position in time of the positive going signal transition is varied in response to a manipulating signal U. Thus, for increasing the mean value of the output signal, the rising edge (positive going signal transition) is advanced in time as indicated by shaded areas and an upwardly directed arrow in the first time interval, at the end of the third time interval and in the fourth interval, so that the pulses become wider. For decreasing the mean value of the output signal, the leading edge (positive going signal transition) is delayed as indicated by the vertically hatched area and the downwardly pointing arrow in the third time interval, which makes the respective pulse narrower. As a comparison of FIG. 5a and 5b show that the regulation does not only vary the width of the (positive) pulses and the duty cycle of the waveform but also shifts the center of the pulses relative to that of the basic signal (FIG. 5a).

Quite similar conditions prevail in a phase controlled (line commutated) inverter or converter, the basic signal of which is shown in FIG. 5b. Also in this case, the rising edge (positive going signal transition) is advanced or delayed in response to the manipulated signal as shown in FIG. 5c, thus, also here the position of the center of the pulses which in this case are alternatingly positive and negative going, is varied.

The variation of the center of the individual pulses made it up to now impossible, to use manipulating means which respond to such a periodic signal in which the position of the individual pulses may vary permanently. More specifically severe problems arise when a DB-type controller is used because between positive going signal transitions a longer time $T_{ab}$ elapses between the acceleration and the retardation resulting in a greater effect than between negative going transitions.

Figure 7A:
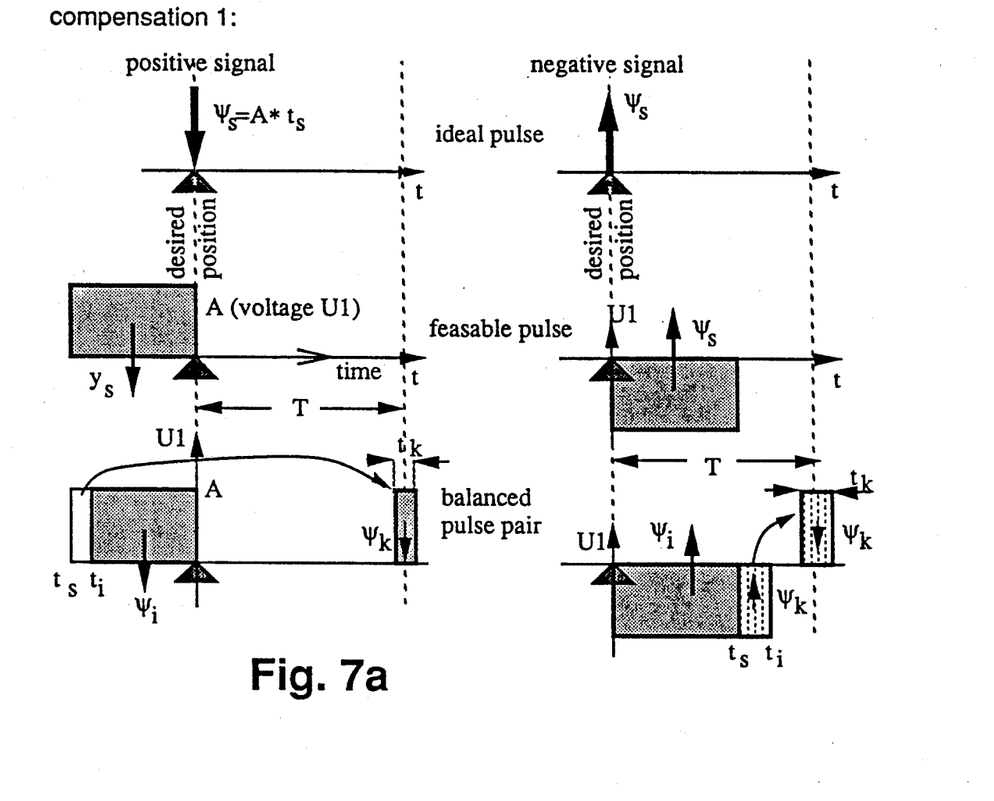

This problem is avoided by the correcting circuit 200 shown in FIG. 3b. The correcting circuit 200 has an input $PSI_s$ which receives the uncorrected manipulated signal, and an output $PSI_i$ at which a corrected manipulated signal is available. A first, non-inverting input terminal (+) of a summing/differential amplifier 203 is coupled to the input $PSI_s$. The output of amplifier 203 is coupled to the output $PSI_i$ A function calculating unit receives an input fed back from the output $PSI_i$ of the amplifier 203 and provides a correcting signal $PSI_k$ which is applied directly to an inverting input of the amplifier 203 and to the input of a n-stage shift register 202 which delays the input signal by up to a number n of clock periods. The output of the shift register 202 is coupled to a second non-inverting input (+) of the amplifier 203. Thus, the correcting signal $PSI_k$ provided by the function generator 201 is subtracted directly from the uncorrected input signal $PSI_s$ and is added after a delay by n clock periods to the uncorrected signal. In the simplest case as in a pulse-width modulated chopper, the pulses are divided in two portions of which one portion is delayed and added to a subsequent pulse as shown in FIG. 7a. The upper diagram in FIG. 7a shows the desired position which a positive going signal (left side) and a negative going signal (right side) should have in an ideal case. When in a real case a positive pulse is shifted by the signal area $PSI_s$ to the left by advancing the positive edge of the pulse as shown in the middle left diagram of FIG. 6a this shift is balanced in respect to the position of the center or the desired position by dividing the signal area $PSI_s$ two portions $PSI_i$ and $PSI_h$ and shifting the signal portion $PSI_k$ by one clock period to the right so that the center of the two signal portions will have the desired position.

The correction of a negative pulse shifted to the right in respect to the desired position is effect by dividing the signal area $PSI_s$ in two signal portions $PSI_i$ and $PSI_k$ as in the previous case, however, the signal portion PSI$_k$ is inverted in addition to being delayed by one clock period T whereby again the common center of the signal portions is repositioned to the desired position as it is shown in the right side of FIG. 6a.

The voltage-time areas of the pulses are thus balanced by this first type of correction ("compensation 1") so that the center always coincides with the desired position of the ideal pulses.

Figure 8:
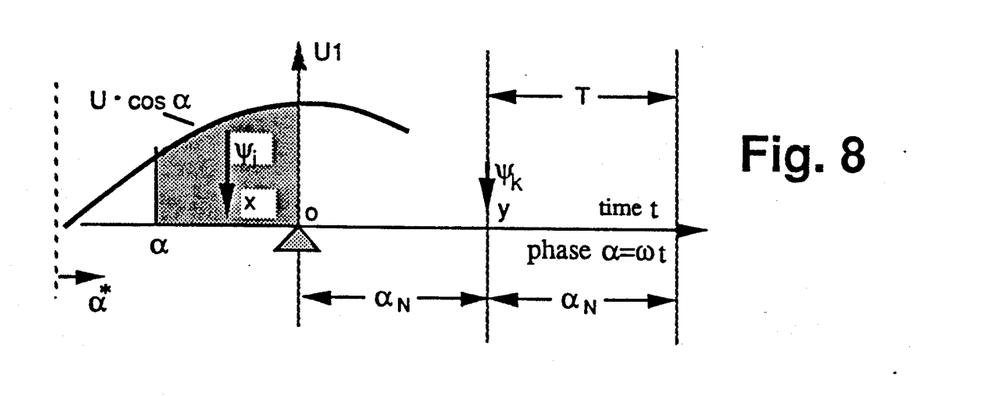
Figure 9:
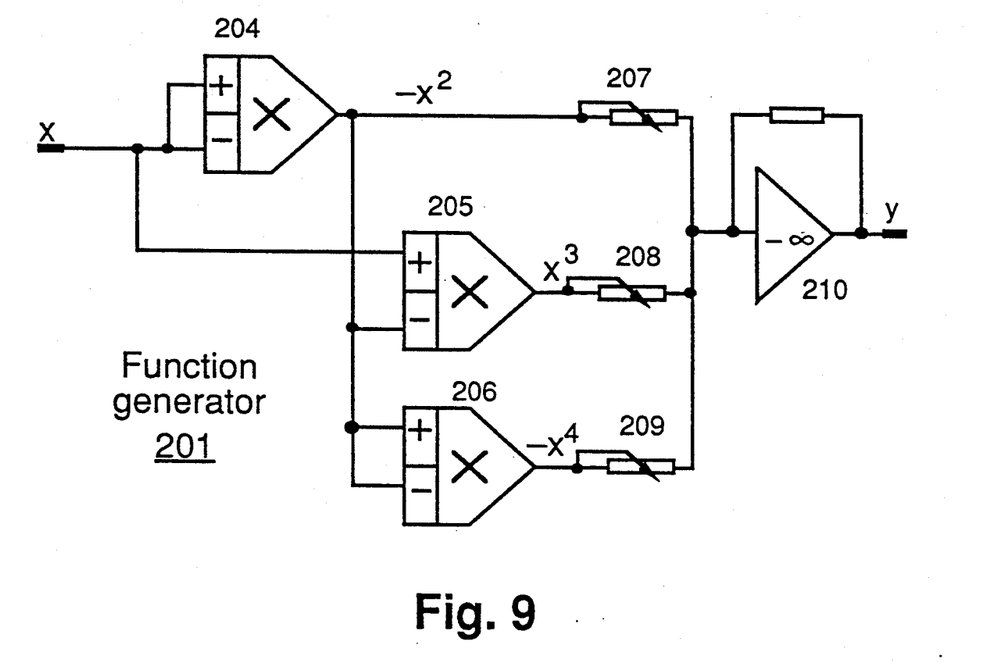
FIG. 9 is a circuit diagram of a function generator useful for the correcting circuit of FIG. 3b.

FIG. 8 is a circuit diagram of an embodiment of the function generator 201 shown in blockform in FIG. 3b. The signal U$_i$ from the output of the amplifier 203 (FIG. 3b) is applied to the inputs of a first multiplier 204 which generates a term of the order X$^2$ which is weighted with a predetermined coefficient by a variable resistor 207. Terms of the order X$^3$ and X$^4$ are produced by further multipliers 205 and 206, respectively. The multiplier 205 has a first input connected to receive the input signal and a second input connected to the output of the first multiplier 204. The third multiplier 206 has its input terminals connected to the output of the multiplier 204. The output signal of multiplier 205 is weighted by a variable resistor 208. The output signal of multiplier 206 is weighted by a variable resistor 209.

Figure 7B:
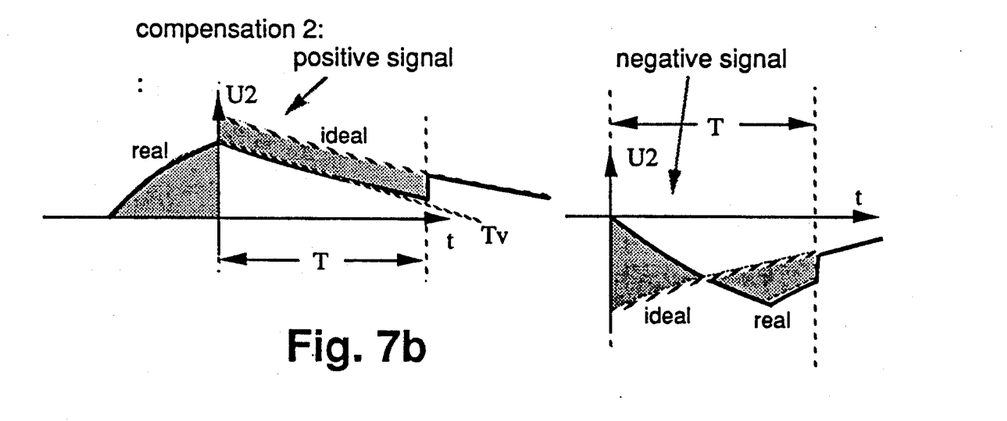

Since in systems exhibiting second order delays, the effect after the first time constant is essential, a further type of correction ("compensation 2") is employed which is shown in FIG. 7b and which takes into account also the second time constant. While compensation 1 balances the voltage-time areas δ U1dt, compensation 2 provides that the voltage-time area δ U2dt and the waveform of U2 after the second time interval is made equal to that of the ideal pulse. With other words, no difference should exist after time interval T whether an ideal pulse is made effective at the correct point of time or a implementable pulse which is shifted in time. This means that in the case of a positive signal (FIG. 7b, left side) and of a negative signal (FIG. 7b, right side) the shaded portions are balanced against each other for obtaining the ideal waveform (broken line) from the real waveform (full line). If a phase-angle controlled, line-commutated converter is to be controlled, linearizing means 220 (FIG. 1) is additionally employed which compensates for the non-linear characteristic of the line-commutated converter.

Other embodiments will occur to those skilled in the art.

What is claimed is:

1. Controlling apparatus comprising
    a) an input for receiving an error signal representing a deviation of an actual value of a variable from a desired value of said variable,
    b) an output (U) for providing a manipulated signal in response to said error signal, said manipulated signal being effective in a predetermined manipulating range,
    c) first controller means (100) having a first output (D) for providing a signal which a function of the rate of change of the error signal, and a second output (P) for providing a proportional signal which is a function of the magnitude of said error,
    d) means (150) for combining the signals from said first and second outputs of said first controller means, and to produce said manipulated signal and to apply it to the output of said apparatus, and further characterized by
    e) clock means (300) for producing clock signals defining subsequent time intervals,
    f) limiting means (105) for limiting in each time interval a manipulated signal that has a portion exceeding said manipulating range to prevent exceeding said manipulating range, and
    g) transfer means (103, 104) for combining the portion of the manipulating signal which exceeds said manipulating range with the manipulated signal of the next following time interval.

2. The apparatus as claimed in claim 1, further comprising averaging means (102) for forming a mean value of the error signal of each time interval.

3. The apparatus as claimed in claim 1, comprising
    h) a differential amplifier (101) having a first input (−) for receiving said error signal, a second input and an output
    i) integrating means (102) having an input and an output, said input being coupled to the output of the differential amplifier (101) and
    k) feedback means having an input and an output connected to couple a portion of the output signal of the integrating means (102) to said second input (+) of said differential amplifier (101)

4. The apparatus as claimed in claim 3 further characterized by
    adding means (104) having first and second inputs and an output, said first input being coupled to the output of said feeback means, said output being coupled with the second input of said differential amplifier (101), and
    delay means (103) having an input and an output, said input being coupled to receive a signal from the output of said adding means (104), and said output being connected to deliver a delayed signal to the second input (+) of said adding means (104).

5. The apparatus as claimed in claim 4, wherein said delay means (103) provides an output signal which is delayed by one time interval relative to the signal at the input of said delay means.

6. The apparatus as claimed in claim 3, characterized in that said limiting means (R1, R2, 105) is coupled between the output of said differential amplifier and the input of said integrating means (102).

7. The apparatus as claimed in claim 1, further comprising second controller means (120) having an input and an output, said input being coupled to said second output (P) of said first controller means (100), and said output providing a signal which represent a time integral of the signal applied to the input of the second controller means.

8. The apparatus as claimed in claim 1, further comprising third controller means (110) having an input and output, said input being coupled to receive said derivative signal from said first output of said first controller means (100) said output providing pulses which in an accelerating phase represent a larger rate of change of said error signal than said derivative signal, and in a later retardation phase represent a smaller amplitude than that corresponding the rate of change of said error signal and having reverse polarity.

9. The apparatus as claimed in claim 8, wherein said third controller means (110) comprises
    an input terminal and an output terminal,
    a differential amplifier (115, 115') having first and second inputs and an output, said first input of said differential amplifier being coupled to that input terminal, said output coupled to said output terminal, delay means (114, 114') having an input for receiving an input signal, and output for providing an output signal delayed relative to said input signal, said output being coupled to said second input (−) of said differential amplifier (115, 115') and coupling means (113, 113') for coupling at least a portion of the input signal of said third controller to the input of said delay means (114, 114').

10. The apparatus as claimed in claim 9 wherein said delay means (114, 114') provides a delay by an integer number (including one) of time intervals.

11. Control apparatus comprising
   a) an input for receiving an error signal representing a deviation of an actual value of a variable from a desired value of said variable said error signal having a magnitude which is subject to vary with a rate of change,
   b) an output (U) for providing a manipulated signal in response to said error signal,
   c) first controller means (100) having a first output (D) for providing a first output signal which a function of the rate of change of the error signal, and a second output (P) for providing a second output signal which is a function of the magnitude of said error,
   d) means (150) for combining said first and second output signals to produce a combined signal,
characterized by correcting means (200) having an input terminal and an output terminal, said input terminal being connected to receive said combined signal, said correcting means being adapted to provide a corrected manipulated signal at the output terminal, said corrected manipulated signal including a first portion of said combined signal and a delayed second portion of said combined signal.

12. The apparatus as claimed in claim 11 characterized by
   an amplifier (103) having first, second and third input terminals and an output terminal, said first input terminal being an additive input terminal and coupled to the input of said correcting means, said output being coupled to the output of said correcting means,
   a function generator (201) having an input terminal coupled to the output of said amplifier (203 and an output terminal, coupled to said second input of said amplifier which is a subtractive input, and
   delay means (202) having an input terminal for receiving an input signal from the output of said function generator (101) and an output terminal which provides a delayed version of said input signal and is coupled to said third input of said amplifier which is an additive input, said delay means (202) delayed said input signal by an integer member (including one) of time intervals.

13. The apparatus as claimed in claim 12, wherein said function generator provides a function in form of a power series.

14. A method of closed-loop control in which a manipulated signal is produced {n response to an error signal (X), said error signal being subject to change with a rate of change, said manipulated signal being a function at least of a derivative signal corresponding to the rate of change of said error signal, and a proportional signal which is a function of the magnitude of said error signal; said manipulated signal having a predetermined manipulating range and controlling a repetitive signal consisting cf a series of subsequent cycles, each cycle containing a positive going signal transition and a negative going signal transition; said controlling including varying the time of occurrence of one of said signal transitions in the respective cycle, said method further comprising the steps
   a) dividing said manipulated signal (U) of at least some cycles into a first signal part ($U_i$ and a second signal part ($U_K$),
   b) delaying said second signal part ($U_K$) by at least one cycle ($T_i$) to produce a delayed signal part, and
   c) combining a first signal part ($U_i$) and a delayed signal part ($U_k$) to produce a corrected manipulated signal.

15. The method as claimed in claim 14, wherein in the case of a manipulated signal which advances said transition in time, said second part signal ($U_K$) is delayed by one cycle ($T_i$) and in case of a manipulated signal which delay: said transition said second part signal ($U_K$) is delayed by one cycle and inverted.

16. A method for closed-loop control in which a manipulated signal is produced in response to an error signal ($S_d$) and applied to manipulating means, said error signal being subject to change with a rate of change, said manipulated signal being a function of at least a signal (derivative signal $D_i$) depending on the rate of change of said error signal, and a signal (proportional signal $P_i$) proportional to the magnitude of said error signal, and said manipulated signal having a predetermined manipulating range ($U_h$), said method further comprising
   a) defining a plurality of successive time intervals (i) with a clock time ($T_i$) by a clock signal;
   b) producing an error signal in each time interval,
   c) if the error signal has a magnitude which would result in a manipulated signal which includes a portion exceeding that manipulating range in a given time interval, using in said given time interval for generating said manipulated signal only a portion of said error signal which results in a manipulated signal not exceeding said manipulating range;
   d) in the time interval following said given time interval generating a manipulated signal on the basis of a momentary error signal existing during said following time interval and said exceeding portion of the preceding time interval, and
   e) repeating steps c) and d) if step d) results in a manipulated signal exceeding said manipulating range.

17. The method as claimed in claim 16 wherein said manipulated signal is a function of a sum of at least said derivative signal and said proportional signal, and wherein said limiting step c) comprises limiting said derivative signal ($D_i$) so that said sum does not cause said manipulating signal to exceed said manipulating range, and step d) comprises adding a portion of said sum causing exceeding said manipulating range in said given time interval to a corresponding sum generated in a subsequent time interval.

18. The method as claimed in claim 16, wherein said clock signal is synchronized with a periodically operating manipulating means.

19. The method as claimed in claim 16, wherein said derivative signal is produced in each time interval on the basis of the means value of said error signal within the respective time interval, said derivative signal being a function of the ratio of a derivative action coefficient ($T_V$) and the clock time ($T_i$).

20. The method as claimed in claim 16, wherein an integral signal (I) is derived from said proportional signal (P$_i$), the magnitude of said integral signal being a function of the time integral of the proportional signal limited to said manipulating range.

21. The method as claimed in claim 16, wherein an integral signal (I) is derived from the proportional signal (P$_i$), and wherein the magnitude of said integral signal (I) depends upon the time integral of the proportional signal (P$_i$) limited by reference to the manipulated range.

22. The method as claimed in claim 16, wherein time optimizing pulses (DB$_i$) are derived from the derivative signal (D$_i$) of each time interval, said time optimizing pulses including an accelerating signal pulse having an amplitude (A) occurring in an accelerating phase and a retarding signal pulse having an amplitude (B) occurring in a subsequent retardation phase which is spaced in time from said acceleration phase.

23. The method as claimed in claim 22, characterized in that said derivative signal (D$_i$), said proportional signal (P$_i$) and a further signal which is a function of the time integral of said error and said time optimized signal (DB$_i$) are combined to derive said manipulated signal.

24. The method as claimed in claim 23, wherein in method steps b) and c) the derivative signal (D$_i$) and the proportional signal (P$_i$) are so produced that the sum of the derivative signal (D$_i$), the proportional signal (P$_i$), the said further signal which is a function of the time integral of said error, and the time optimized signal (DB$_i$) does not exceed the manipulating range.

25. The method as claimed in claim 22, wherein the manipulated signal is obtained by summing the derivative signal (D$_i$), the proportional signal (P$_i$), the integral signal (I) and the time optimized signal (DB$_i$).

26. The method as claimed in claim 22, wherein the ratio of the amplitude (A) of said accelerating signal to the amplitude (B) of said retarding signal is $$B/A = -e^{T_{ab}/T_V}$$

wherein (T$_{ab}$) is the time interval between the acceleration phase and the retardation phase (T$_V$) a derivative action time constant of a first function zero.

27. The method as claimed in claim 22, wherein for the control of reproducible process runs at least a part of the derivative signal (Di), the proportional signal (Pi), the integral signal (I) and the time optimized signal (DBi) are stored and a control curve is calculated therefrom for the next run of the process and in the following runs is transferred to the manipulated signal (U) having been advance in time by a time interval necessary for the run of the control method.

28. The method as claimed in claim 22, wherein the amplitude (A) of the accelerating signal and the amplitude (B) of the retarding signal satisfy the equation $$B/A = -e^{T_{ab}/T_V}$$

where Tab is the time interval between the acceleration phase and the retardation phase and Tv is a first derivative action time constant.

29. The method as claimed in claim 22, wherein the amplitude (A) of the accelerating signal and the amplitude (B) satisfy the equation:

$$(A+B) = P_i \cdot T_h/T_i = D_i \cdot T_h/T_v$$

where T$_h$ is a second derivative action on time constant.

* * * * *